Oct. 30, 1928.
R. B. JELLISON
TIRE COVER
Filed Dec. 27, 1926
1,689,438
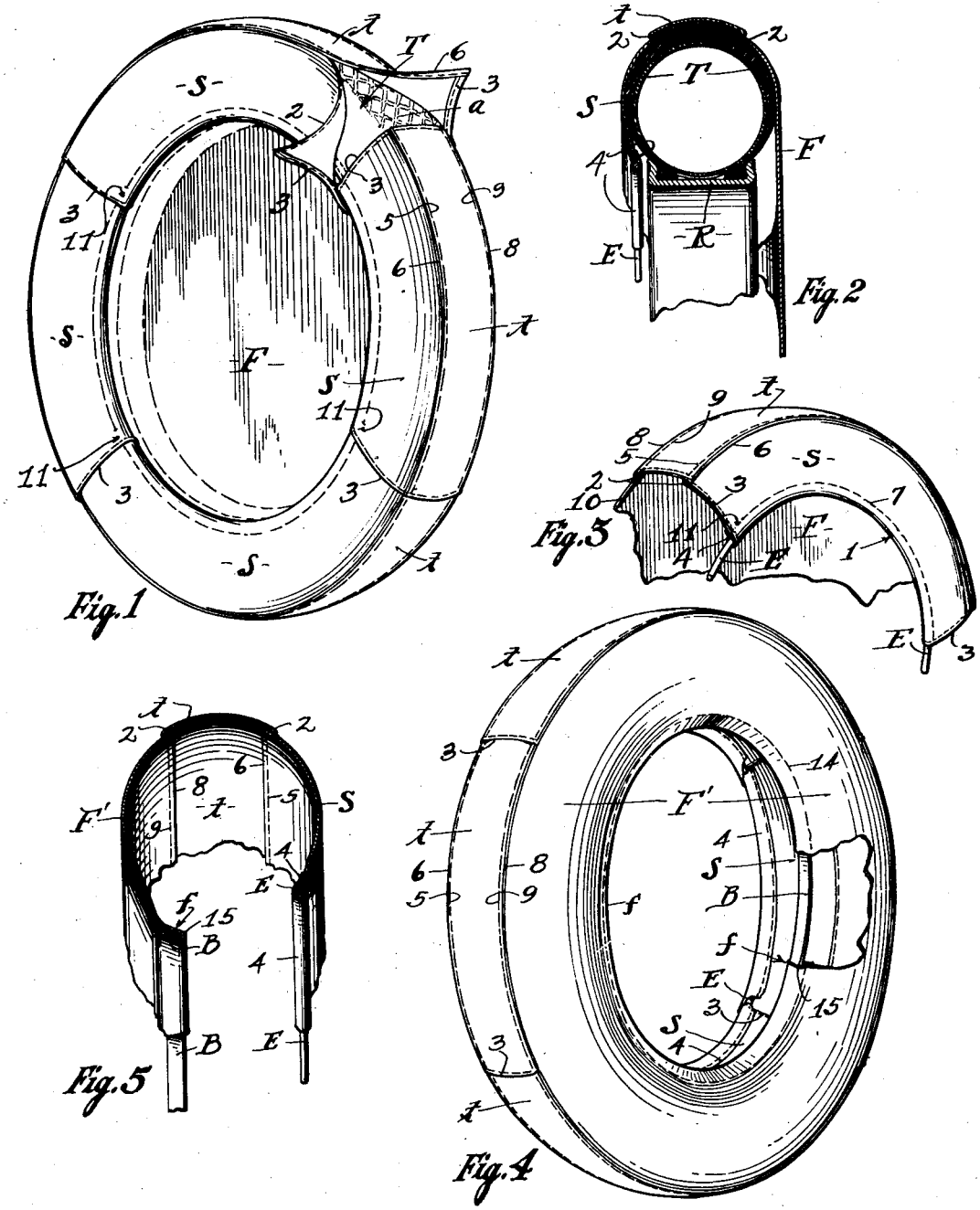
INVENTOR.
Roscoe B. Jellison,
BY
ATTORNEY.

Patented Oct. 30, 1928.

1,689,438

UNITED STATES PATENT OFFICE.

ROSCOE B. JELLISON, OF LOS ANGELES, CALIFORNIA, ASSIGNOR TO PARKER AND WATERMAN MANUFACTURING COMPANY, OF LOS ANGELES, CALIFORNIA.

TIRE COVER.

Application filed December 27, 1926. Serial No. 157,145.

This invention relates to tire covers, and the main object is to provide an improved type of tire cover adapted to be constructed of water-proof material, arranged so as to completely enclose a tire, and so formed and constructed that it may be quickly removed from or attached to a tire.

A more detailed object is to provide an improved tire cover of either the open or closed type, constructed of a plurality of segments overlapping at their ends and permanently attached together on only one side of the cover, together with means held in the free ends for resiliently holding the segments in closed position.

Another and important object of my invention is to provide a tire cover so constructed of a plurality of sections that when the cover is in position over a tire, the cross section at all points will be such that the cover will closely conform to the surface of the tire and provide a neat appearance, free from wrinkles, such as are occasioned by the use of tire covers constructed by methods now in vogue.

Other objects will appear as the description progresses.

In the accompanying drawings I have shown a preferred embodiment of my invention, subject to modification within the scope of the appended claims without departing from the spirit thereof, in which:

Fig. 1 is a perspective view of a tire cover of closed front type, embodying my improvements, shown in position on a tire.

Fig. 2 is a transverse section of the same in position on a tire and rim.

Fig. 3 is a perspective view of a single segment of the type of cover shown in Fig. 1.

Fig. 4 is a perspective view of the tire cover of the open front type, embodying my improvements, and Fig. 5 is a transverse fragmentary section of the same.

First, referring to the closed type of cover shown in Figs. 1, 2 and 3, the front thereof, which is closed, is formed of a single circular piece of material as at F. The central or tread section of the cover is composed of a plurality of straight sections as at $t$, $t$, etc., corresponding substantially in width to the tread portion as at $a$, $a$, of the tire, as at T, and the back open side of the cover is formed of a plurality of segments as at S, S, etc., all of which portions are attached together as hereinafter described.

My tire cover is formed of a suitable number of sections, four of such sections being shown in the drawing, and each of said sections is composed of one of the tread portions $t$, and one of the back portions S. The segments S are cut from sheets of material with arcuate edge portions 1 and 2 described about a common center and their margins 3, 3, which are radially disposed from the same center. The inner arcuate margins 1 of the segments S are provided with open seams 4, through which an elastic band E is drawn and suitably secured together at the ends, so as to form a continuous band extending through the seams 4 of all of the segments S.

The outer marginal portions 2 of the segments S are stitched at 5 to one of the edges 6 of the treads $t$, said edges 6 being folded inwardly so as to provide a neat joint between the portions $t$ and S, as shown. Also, the end margins 3 of the segments S are folded inwardly so as to prevent the edges from fraying. The seam 4 on said segments is formed by folding the margins 1 inwardly and upwardly and by stitching the ends thereof at 7 to the boss of the segments, so as to provide a channel in the seam 4 in which the elastic band E may be closely held. The front margins 8 of the treads $t$ are similarly folded and stitched at 9 to the circular margins 10 of the front F.

As indicated in Fig. 1, one of the sections comprising a tread $t$ and a segment S is ripped at the joint therebetween where the margins 2 and 8 of the said segments and said tread portions are joined, so as to show the overlapping relation of the several sections of the tire cover with respect to the other sections. Thus, it will be observed that while each of the sections composing a member $t$ and a member S are permanently stitched together, and also are permanently attached to the margins 10 of the member F, said sections are not connected together at their ends, but are adapted to be overlapped for a sufficient distance to provide a perfect water-seal for preventing exposure of the tire within the cover to the elements. As shown in Fig. 1, the upper central section overlaps the upper ends of the two opposite side sections, while said two side sections overlap the central between section. Thus all of the joints between the several sections are closed against the entrance of water.

At the joints between the several sections of the segments S, the seams 4 which carry the elastic band E are left open for an inch or so, as at 11 in Figs. 1 and 3, while at the other ends of the sections the seams are closed. Thus the closed ends may be inserted in the open ends of the adjacent sections. It will be observed, therefore, that when a cover of this type is mounted on the tire T, as shown in Fig. 2, the tread portion t will serve to cover the tread 10 of the tire, while the single front member F, being circular will conform itself to the curved periphery of the tire on one side and extend entirely around the tire, forming a closure for the opening in the rim R when the cover is positioned properly for use. This type of cover provides against the accumulation of dirt and dust on the tire and in the rim, and also provides a neat and attractive appearance.

The back side of the cover, which is formed by the segments S, conforms closely to the curvature of the tire T, and due to the elasticity in the band E the segments are drawn slightly inwardly in the direction of the rim, and are held in closely fitting relation free from wrinkles and so as to almost, if not quite, completely cover the tire T.

An open type cover, as shown in Figs. 4 and 5, may be constructed in accordance with my invention, by employing in lieu of the circular member F on the front, an annular member as at F', which may be formed of a single piece of material, as shown in Fig. 4, or of a plurality of segments similar to those S, S, etc., being sewed together at their meeting ends. In this type of cover the side F' is provided with an annular flap f, which is folded back and stitched at 14 so as to provide a seam 15 within which is held a metal band B, arranged so that this flap will closely fit and underlie the rim R.

Thus, it will be observed that in either of the types of cover described, the cross section of the cover, due to the cutting of the patterns for the sections and the manner in which the same are attached together will closely fit the periphery of the tire, and provide a neat and attractive cover.

What I claim is:

1. A tire cover having one integral circular side member, a plurality of overlapping tread sections secured to the circular margin of said side, and a plurality of segments secured at their outer margins to said tread sections and forming a second side portion.

2. A tire cover including one integral circular side member, a plurality of peripheral sections secured at corresponding sides to the outer margin of said side member, and a plurality of segments having concentric inner and outer margins secured at said outer margins to the other edges of said peripheral sections, the adjacent ends of said segments being disconnected and overlapping each other for the purpose described.

3. A tire cover including a one piece circular side member, a plurality of peripheral sections secured at corresponding edges to the periphery of said side member, a plurality of segments having arcuate inner and outer margins and secured at said outer margins to the other sides of said peripheral sections for providing a second side of sectional character, the adjacent ends of said segments and said peripheral sections being disconnected and overlapping each other for seating the joints between said sections.

4. A tire cover comprising a one-piece continuous circular side member, another side composed of a plurality of segments having concentric inner and outer margins, a plurality of peripheral sections permanently attached at their opposite edges to the outer margins of said segments and to the periphery of said circular side member, and elastic means carried in the inner margins of said segments for holding the cover stretched over a tire.

5. A tire cover including a one-piece circular side member, a plurality of peripheral sections secured at corresponding edges to the outer margin of said side member, a plurality of segments having concentric inner and outer margins and secured at their outer margins to the other edges of said peripheral sections, said peripheral sections and said segments being detached at adjoining extremities and adapted to overlap each other, and an elastic band supported in the inner marginal portions of said segments, for the purpose described.

R. B. JELLISON.